United States Patent Office 3,732,322
Patented May 8, 1973

3,732,322
PROCESS FOR THE PRODUCTION OF
CHLOROETHYLENES
Takeo Kawaguchi, Reiji Saito, Sanpei Watanabe, and
Yoshitaka Suzuki, Minato-ku, Nagoya, Japan, assignors
to Toagosei Chemical Industry Co., Ltd., Minato-ku,
Tokyo, Japan
No Drawing. Filed Aug. 19, 1969, Ser. No. 851,467
Int. Cl. C07c 21/00
U.S. Cl. 260—654 D          1 Claim

ABSTRACT OF THE DISCLOSURE

Chloroethylenes, trichloroethylene, tetrachloroethylene, etc. are prepared in a high yield by pyrolysis, in vapor phase, of tetrachloroethane, pentachloroethane or mixtures thereof.

No carbon is seen to be by-produced.

---

The present invention relates to a process for preparing trichloroethylene or tetrachloroethylene by vapor phase pyrolysis of tetrachloroethane, pentachloroethane or mixtures thereof.

The preparation of chloroethylene or tetrachloroethylene by the vapor phase pyrolysis of tetrachloroethane or pentachloroethane, respectively, has been known a long time and the fact that carbon is by-produced in these uses is also well known. The by-produced carbon, in general, deposits in layer on the wall of a reaction tube, but partly flows out of the reaction tube in a form of minute particles, together with the main product.

In case of industrially pyrolyzing tetrachloroethane and pentachloroethane, the above-mentioned phenomenon is greatly undesirable. The by-produced carbon adheres on the wall of reaction tube and its thickness increases as the reaction proceeds. Consequently, it chokes the reaction tube. Even if the choking does not occur, the carbon adhering on the wall interferes a supply of heat from the wall to the reaction zone, and makes the smooth reaction impossible. Thus, when the amount of carbon adhering on the wall attains a certain extent, it is necessary to discontinue the reaction to remove adhering carbon according to a method of burning with an oxygen-containing gas or by using a mechanical means. Moreover, carbon by-produced partly flows out of a reaction tube together with the main product and then stains or chokes downstream processing equipment. Such equipment must also be washed regularly. Undoubtedly such procedures are economically disadvantageous.

An object of the present invention is to provide a method for removing a troublesome carbon by-produced which is accompanied with the conventional method of vapor phase pyrolysis of tetrachloroethane and pentachloroethane and preparing trichloroethylene and tetrachloroethylene from tetrachloroethane and pentachloroethane in a high yield.

The present inventors has succeeded in a removal of carbon by-produced on a vapor phase pyrolysis of tetrachloroethane or/or pentachloroethane by adding ferric chloride in vapor phase to the reaction zone and have pyrolysis in high yield.

Tetrachloroethane, a compound which is to be pyrolyzed in the present invention, may either be 1,1,1,2-tetrachloroethane or 1,1,2,2-tetrachloroethane.

The present process can very advantageously be carried out even if tetrachloroethane and pentachloroethane, which are to be pyrolyzed, are of high purity, of mixtures of the two chloroethanes, or of mixtures of these chlorinated ethanes with such chlorinated hydrocarbons as 1,1,2-trichloroethane, hexachloroethane and the like. However, the presence of hydrocarbon chlorides having at least 3 carbon atoms, as the incorporated chlorinated hydrocarbons, tends to promote the by-production of carbon and thus should be eliminated as much as possible.

In the compounds which are to be pyrolyzed in the present invention, 1,1,1,2-tetrachloroethane most effectively exhibits the effect of improving the conversions in the present invention, and next thereto, pentachloroethane is effective. The compound which shows the least effect is 1,1,2,2-tetrachloroethane. Every chlorinated ethane exhibits the effect of preventing the carbon by-production due to pyrolysis.

Ferric chloride of the present invention in a vapor phase possesses the effect of preventing the by-production of carbon, and thus it must be fed to the reaction zone so as to exist therein in a state of vapor. Since the boiling point of ferric chloride is 315° C., the prevaporized pure vapor may easily be charged into the reaction zone. Any method, however, for providing the vapor can be utilized so long as the presence of ferric chloride in a vapor phase in the reaction zone is achieved. For example, if ferric chloride is dissolved in tetrachloroethane or pentachloroethane which is the starting material, ferric chloride may be evaporated together with the said chlorinated hydrocarbon and fed to the reaction system. In contrast to the direct feeding of ferric chloride, it may be possible to employ a process in which an iron rust portion is placed before the heat-decomposer or in the vicinity of the inlet of the heat-decomposer in order that the gas to be pyrolyzed contains the specified amount of ferric chloride to produce ferric chloride vapor and then said vapor is fed to the reaction system. The ferric chloride catalyst used in the present invention, as mentioned above, is charged to and discharged from the reaction system continuously. This eliminates such inconveniences as the discard and exchange of catalyst as in the case of using a fixed catalyst or flow catalyst.

The effects of preventing the carbon by-production and improving the conversion of tetrachloroethane and pentachloroethane by the use of ferric chloride vapor depend on the concentration of ferric chloride. These effects rapidly decrease when the ferric chloride concentration is lower than 0.001 mole percent based on the starting tetrachloroethane or/and pentachloroethane. Thus, the ferric chloride concentration in the reaction zone should be 0.001 mole percent or higher, more preferably, 0.01 mole percent or higher. The higher ferric chloride concentration affords the higher effectiveness, but when this concentration exceeds 0.5 percent, not only does the loss of ferric chloride increase but also the more preferable effect is reduced. Ferric chloride rather accumulates on the outlet side of the reaction tube and disturbs the smooth flow of reaction gas. In general, if the concentration of ferric chloride is about 0.02 mole percent based on the compound to be pyrolyzed, it is possible to decompose tetrachloroethane (particularly, 1,1,1,2-tetrachloroethane) with a conversion of near 100 percent and pentachloroethane with a conversion of almost near 100 percent, without substantial carbon by-production.

The present process, in general, requires a low reaction temperature to prevent carbon by-production, but a high temperature to obtain a better conversion. A temperature of 420° to 460° C. is most preferable in general. If the reaction temperature attains about 500° C., carbon is substantially produced so that the effect of the present invention is reduced.

It is known that the pyrolysis of tetrachloroethane and pentachloroethane proceeds according to a radical chain reaction, and the addition of chlorine, carbon tetrachloride, hexachloroethane, etc, as a radical producing agent promotes the reaction. In this case, however, carbon is still by-produced. The present invention can be applied to such a reaction involving the presence of a radical producing agent, and exhibits remarkable effects. Further, undoubtedly the present invention can be applied to other modified methods of pyrolysis, as well.

If the present invention is applied to the case of using, as a starting material, a polychlorinated ethane mixture, the main component of which is 1,1,1,2- and 1,1,2,2-tetrachloroethane obtained by the liquid phase chlorination of ethylene in the absence of a catalyst, 1,1,1,2-tetrachloroethane is changed almost completely and does not remain in the product liquid. Thus, the present invention does not bring about the difficulties in the separation of 1,1,1,2-tetrachloroethane from tetrachloroethylene produced by dehydrochlorination of pentachloroethane, boiling points of which do not differ much from each other.

The present invention is described in detail by the following examples, wherein percents are by mole.

EXAMPLE 1

A transparent quartz reaction tube having a 28 mm. internal diameter and a 600 mm. length is filled with 4 mm. x 7 mm. porcelain Raschig rings. To this reaction tube, the vapor of 1,1,1,2-tetrachloroethane containing 0.04 percent of ferric chloride was charged at a reaction temperature of 460° C. at a rate of SV 300 hr.$^{-1}$ (the reduced value to the standard state of vapor); the same shall apply hereinafter) and was allowed to react for 12 hrs. As the results, the 1,1,1,2-tetrachloroethane is converted to the extent of 99.5 percent so as to produce trichloroethylene almost quantitatively. The by-production of carbon was almost not noticed.

Subsequently, at the same reaction temperature, the 1,1,1,2-tetrachloroethane vapor free from ferric chloride was charged to the same reaction tube at a rate of SV 39 hr.$^{-1}$ and allowed to react. As the result, even if the charging rate was low, 1,1,1,2-tetrachloroethane was converted only to the extent of 95.2 percent.

EXAMPLE 2

To the same reaction tube as in Example 1, the vapor of polychlorinated ethane mixture (1,1,1,2-tetrachloroethane 39%, 1,1,2,2-tetrachloroethane 45%, pentachloroethane 16%) containing 0.05 percent of ferric chloride was charged at respective temperatures of 410, 435, 460 and 490° C. at a rate of SV 150 hr.$^{-1}$, and was allowed to react for 12 hrs. As the result, the conversion of each chlorinated ethane was as shown in Table 1.

TABLE 1

| Component | Temperature, ° C. | | | |
|---|---|---|---|---|
| | 410 | 435 | 460 | 490 |
| 1,1,1,2-tetrachloroethane | 78 | 97 | 100 | 100 |
| 1,1,2,2-tetrachloroethane | 47 | 83 | 96 | 98 |
| Pentachloroethane | 25 | 61 | 75 | 87 |
| Carbon by-produced | None | None | None | [1] + |

[1] Raschig rings filling the reaction tube was covered with carbon so as to exhibit black color.

In this example, the polychlorinated ethane mixture which did not contain ferric chloride at all was subjected to the reaction at 460° C. As the results, the conversion of each chlorinated ethane was as given in Table 1. In this case, the by-production of carbon was remarkable.

Table 2

| Component: | Conversion (percent) |
|---|---|
| 1,1,1,2-tetrachloroethane | 79 |
| 1,1,2,2-tetrachloroethane | 90 |
| Pentachloroethane | 55 |

EXAMPLE 3

A transparent quartz reaction tube having a 28 mm. internal diameter and 850 mm. length was filled with 5 mm. x 5 mm. porcelain Raschig rings. While controlling the temperature of the inside of the tube at 460° C., symtetrachloroethane or/and pentachloroethane was charged to the above-mentioned tube at a rate of SV 140 hr.$^{-1}$ for 20 hours to carry out the pyrolysis. Table 3 shows results with or without employing ferric chloride vapor. The symbol (+) in the columns of by-production of carbon in Table 3 represents the facts that the porcelain Raschig rings in the reaction tube are covered with carbon and exhibit black color, and the symbol (−) represents the facts that the porcelain Raschig rings remains white as those before the reaction and the byproduction of carbon is not observed. However, a trace of carbon was observed in Experiment 5 (\*\*\*). Experiment 6 (\*) shows an example of the case which contains chlorine in an amount of 0.5 percent based on 1,1,2,2-tetrachloroethane; Experiment 7 (\*\*) shows an example of the case which contains hexachloroethane in an amount of 1 percent based on 1,1,2,2-tetrachloroethane.

These results indicate that ferric chloride exhibits a remarkable effect on the prevention of the by-production of carbon in the pyrolysis of 1,1,2,2-tetrachloroethane and pentachloroethane, and that it also possesses a relatively large effect on promoting the reaction.

TABLE 3

| Experiment No. | Starting materials charged | The case without ferric chloride | | The case with ferric chloride | | |
|---|---|---|---|---|---|---|
| | | Conversion (percent) | By-production of carbon | Concentration of ferric chloride (mole percent) | Conversion (percent) | By-production of carbon |
| 1 | 1,1,2,2-tetrachloroethane | 76.4 | (+) | 0.1 | 84.7 | (−) |
| 2 | Pentachloroethane | 83.3 | (+) | 0.3 | 99.6 | (−) |
| 3 | Equimolar mixture of 1,1,2,2-tetrachloroethane and pentachloroethane. | 1,1,2,2-tetrachloroethane, 92.5; Pentachloroethane, 55.0. | (+) | 0.3 | 1,1,2,2-tetrachloroethane, 95.1; Pentachloroethane, 98.7. | (−) |
| 4 | do | do | (+) | 0.02 | 1,1,2,2-tetrachloroethane, 92.5; Pentachloroethane, 74.5. | (−) |
| 5 | do | do | (+) | 0.005 | 1,1,2,2-tetrachloroethane, 92.1; Pentachloroethane, 68.2. | (−)\*\*\* |
| 6 | 1,1,2,2-tetrachloroethane\* | 90.0 | (+) | 0.2 | 93.1 | (−) |
| 7 | do.\*\* | 92.5 | (+) | 0.1 | 95.3 | (−) |

What we claim is:

1. A process for preparing chloroethylenes by pyrolyzing at 420–460° C. in vapor phase 1,1,1,2-tetrachloroethane or polychloroethanes containing 1,1,1,2-tetrachloroethane in the presence of 0.01 to 0.5 mole percent based on the chlorinated ethane of vaporized ferric chloride.

References Cited

UNITED STATES PATENTS

| 2,894,045 | 7/1959 | Carley et al. | 260—654 |
| 2,859,254 | 11/1958 | Eisenlohr | 260—654 |
| 2,593,451 | 4/1952 | Hill et al. | 260—654 |

HOWARD T. MARS, Primary Examiner

A. SIEGEL, Assistant Examiner